(12) United States Patent
Park et al.

(10) Patent No.: US 7,539,119 B2
(45) Date of Patent: May 26, 2009

(54) DATA STORAGE APPARATUS USING CURRENT SWITCHING IN METAL OXIDE LAYER

(75) Inventors: Jong Hyurk Park, Daeju (KR); Seong Jae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 590 days.

(21) Appl. No.: 11/296,935

(22) Filed: Dec. 7, 2005

(65) Prior Publication Data

US 2006/0153049 A1 Jul. 13, 2006

(30) Foreign Application Priority Data

Dec. 15, 2004 (KR) ............ 10-2004-0106501
Aug. 18, 2005 (KR) ............ 10-2005-0075659

(51) Int. Cl.
*G11B 7/00* (2006.01)
(52) U.S. Cl. .................... 369/126; 369/100
(58) Field of Classification Search ........... None
See application file for complete search history.

(56) References Cited

U.S. PATENT DOCUMENTS

| 5,293,335 | A | 3/1994 | Pernisz et al. | |
| 6,542,400 | B2 * | 4/2003 | Chen et al. | ................. 365/151 |
| 6,653,193 | B2 | 11/2003 | Gilton | |
| 6,781,868 | B2 | 8/2004 | Bulovic et al. | |
| 2002/0106849 | A1 | 8/2002 | Moore | |

2005/0141397 A1 6/2005 Park et al.

FOREIGN PATENT DOCUMENTS

KR 10-2006-0065015 6/2006

OTHER PUBLICATIONS

"Memory switching in thermally grown titanium oxide films", A.A. Ansara, et al., J. Phys, D: Appl. Phys. 18 1985, pp. 911-917, The Institute of Physics.
"Electrical current distribution across a metal—insulator-metal structure during bistable switching", C. Rossei, et al., Journal of Applied Physics, vol. 90, No. 6, Sep. 15, 2001, pp. 2892-2898.
"Reproducible switching effect in thin oxide films for memory applications", A. Beck, et al., Applied Physics Letters; vol. 77, No. 1, pp. 139-141, Jul. 3, 2000.

* cited by examiner

*Primary Examiner*—Muhammad N. Edun
(74) *Attorney, Agent, or Firm*—Blakely, Sokoloff, Taylor & Zafman LLP

(57) ABSTRACT

Provided is a data storage apparatus using current switching in a metal oxide layer. The data storage apparatus includes a substrate; a lower electrode layer disposed on the substrate; a metal oxide layer disposed on the lower electrode layer; a probe tip disposed on the metal oxide layer opposite the lower electrode layer and for scanning a local region of the metal oxide layer in units of nanometer, wherein the probe tip applies a write voltage to the local region of the metal oxide layer so that the resistance of the local region is sharply changed until a resistive state of the local region is switched from a first state to a second state or measures current flowing through the local region according to the resistive state and reads data stored in the local region; a driver for transferring the position of the probe tip to the local region of the metal oxide layer; and a controller for controlling the probe tip and the driver.

5 Claims, 2 Drawing Sheets

DATA STORAGE APPARATUS USING CURRENT SWITCHING IN METAL OXIDE LAYER

CROSS-REFERENCE TO RELATED PATENT APPLICATION

This application claims the benefit of Korean Patent Application Nos. 10-2004-0106501, filed on Dec. 15, 2004, and No. 10-2005-0075659, filed on Aug. 18, 2005, in the Korean Intellectual Property Office, the disclosure of which is incorporated herein in its entirety by reference.

BACKGROUND OF THE INVENTION

1. Field of the Invention

The present invention relates to a data storage apparatus, and more particularly, to a data storage apparatus using current switching in a metal oxide layer.

2. Description of the Related Art

A method of recording data to store and reproduce the data may be typically categorized into a magnetic recording method, an optical recording method, and an electrical recording method. Nowadays, the magnetic recording method is being widely used for a high-capacity storage apparatus, and the optical recording method is being efficiently utilized for portable use. In recent years, a data storage apparatus using electricity, such as a flash memory device, has spread at high speed along with technical development and retrenchment of production cost.

However, the above-described data recording methods have some shortcomings. For example, in the case of magnetic recording, even if a magnetic sensor, which is used to record and reproduce data, is of highest sensitivity, the maximum storage density is restricted due to superparamagnetic limit. In the case of optical recording, since there is diffraction limit according to the wavelength of light used for recording and reproduction of data and the numerical aperture of a lens, it is difficult to improve storage density.

By comparison, in the case of electrical recording, there is no substantial limit to the size of mediums to which current is supplied to store data. Therefore, it is highly likely that storage density will greatly increase. In general, it is considered that the electrical recording method may be applied to a flash memory device, which stores data by injecting charges into a $SiN_xO_y$ layer, or a ferroelectric random access memory (FRAM), which makes use of dielectric polarization of a high-k dielectric material.

However, the flash memory device includes a charge injection region for storing electrical data, which is located in a trap state disposed at an interface of the $SiN_xO_y$ layer. In this case, it is difficult to uniformly control the density of the trap state. Also, the phenomena of aging result from repetition of writing and erasing. The FRAM also has similar problems. As the thickness of the dielectric material decrease, the magnitude of the dielectric polarization decreases, thus the FRAM loses its ferroelectric characteristic. Furthermore, thermal damage is caused by a fabricating process and repetition of writing and erasing leads the FRAM to grow older.

Therefore, it is necessary to develop a new data storage apparatus that is structurally simple and involves simple fabricating processes. Also, the data storage apparatus needs a nanoscale control precision to elevate storage density. Further, the data storage apparatus should process data at an ultrahigh integration density so that it can greatly improve in production cost and storage density.

SUMMARY OF THE INVENTION

The present invention provides a data storage apparatus, which makes use of a metal oxide layer as a data storage medium and controls an electrical characteristic in a nanoscale local region of the metal oxide layer so that data can be separately stored and reproduced for each data storage unit.

According to an aspect of the present invention, there is provided a data storage apparatus including a substrate; a lower electrode layer disposed on the substrate; a metal oxide layer disposed on the lower electrode layer; a probe tip disposed on the metal oxide layer opposite the lower electrode layer and for scanning a local region of the metal oxide layer in units of nanometer, wherein the probe tip applies a write voltage to the local region of the metal oxide layer so that the resistance of the local region is sharply changed until a resistive state of the local region is switched from a first state to a second state or measures current flowing through the local region according to the resistive state and reads data stored in the local region; a driver for transferring the position of the probe tip to the local region of the metal oxide layer; and a controller for controlling the probe tip and the driver.

The metal oxide layer may be formed of any one metal oxide selected from the group consisting of zirconium oxide ($ZrO_x$), yttrium oxide ($YO_x$), tantalum oxide ($TaO_x$), and a rare-earth metal oxide.

The metal oxide layer may include a titanium oxide ($TiO_x$) thin layer.

The data storage apparatus may further include a position detector for measuring the position of the probe tip on the metal oxide layer using a laser.

The driver may include a substrate driver for transferring the substrate in at least units of nanometer; and a probe tip driver for driving the probe tip.

The substrate driver may include a piezo scanner used for an atomic force microscope (AFM), and the probe tip driver may include a probe tip driver used for the AFM, which drives the probe tip including a probe tip used for the AFM.

The data storage apparatus may further include a protective layer disposed on the metal oxide layer and formed using a conductive layer that is one of a metal layer and a diamond-like carbon layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
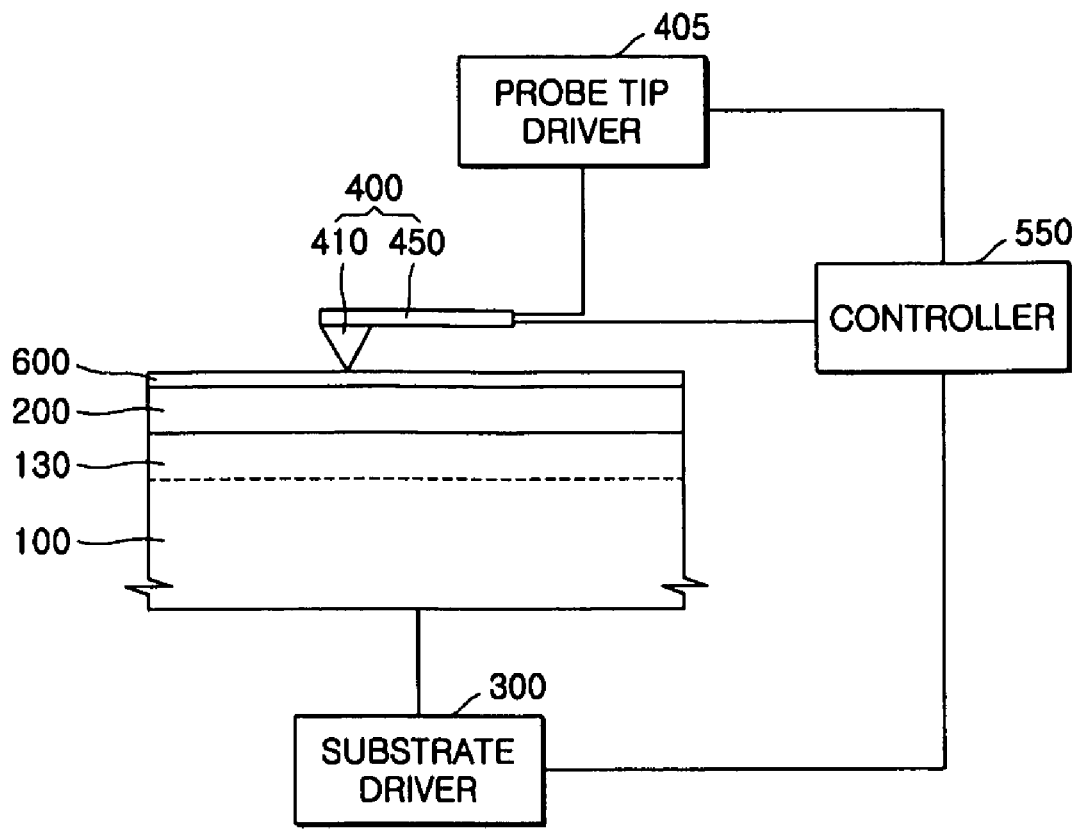
FIG. 1 is a diagram for explaining the structure and operations of a data storage apparatus using current switching in a metal oxide layer according to an exemplary embodiment of the present invention.

The present invention will now be described more fully hereinafter with reference to the accompanying drawings, in which exemplary embodiments of the invention are shown.

This invention may, however, be embodied in different forms and should not be construed as limited to the embodiments set forth herein. Rather, these embodiments are provided so that this disclosure is thorough and complete and fully conveys the scope of the invention to those skilled in the art.

In the exemplary embodiment of the present invention, a data storage apparatus is provided. The data storage apparatus controls the electrical characteristics of local regions of a metal oxide thin layer, and a nanoscale local region is defined as a data storage unit, so that data can be separately stored for each nanoscale local region.

The metal oxide thin layer has a resistance that varies with a voltage applied thereto. For example, this metal oxide thin layer may be formed of $TiO_x$, $ZrO_x$, $YO_x$, $TaO_x$, or a rare-earth metal oxide. In particular, according to an applied voltage, a titanium oxide ($TiO_x$) thin layer may be switched to a state in which the $TiO_x$ layer exhibits a plurality of resistive states. Accordingly, data can be stored in a multi-level in a data storage unit (i.e., a local region).

To form the metal oxide layer, a metal layer may be deposited on a substrate using a sputtering process and then an oxidation process may be carried out. Alternatively, the metal oxide layer may be formed using an atomic layer deposition (ALD) process. That is, a storage medium and a current controlling and measuring apparatus according to the embodiment of the present invention can be fabricated using conventional semiconductor fabrication technology, such as a sputtering process or an ALD process. In this case, a lower electrode may be introduced under the metal oxide layer to allow current to flow into the metal oxide layer. Also, an upper electrode may be as a probe tip type opposite the lower electrode.

The introduction of the upper electrode as a probe tip enables limitation of a data storage unit to a nanoscale local region when data is stored in or reproduced from the metal oxide layer. The probe tip may be a probe tip for an atomic force microscope (AFM) having a nanoscale space resolution.

Thus, a local region of the metal oxide layer opposite the probe tip may have a nano size. That is, a voltage applied by the probe tip may change the electrical characteristics (e.g., resistance) of the nanoscale local region of the metal oxide layer. A change of resistance in the local region of the metal oxide layer implies memory switching, thus enabling storage of data per local region.

An operation of scanning the surface of the metal oxide layer using the probe tip should be performed in order that a data storage operation (or write operation), which leads to a change in the resistance of the local region of the metal oxide layer, or a data reading operation may be performed throughout the metal oxide layer. For this scan operation, the data storage apparatus may include a probe tip driver, which transfers the probe tip, and/or a substrate driver, which drives a substrate on which the metal oxide layer is deposited opposite the probe tip.

In this case, the driver for the scan operation of the probe tip may include a driver for an AFM apparatus, for example, a piezo scanner. Also, a laser measurer, which measures and controls position of the probe tip on the metal oxide layer, may be provided like in the AFM apparatus.

As described above, the data storage apparatus of the present invention can make use of the construction of the AFM apparatus with nanoscale controlling and measuring precision, so that the electrical characteristics of the metal oxide layer can be controlled for each nanoscale local region. Thus, because the electrical characteristics of the metal oxide layer can be partially controlled, the metal oxide layer can be used as a recording medium. Accordingly, an ultrahigh-integrated and ultrahigh-speed data processing apparatus can be embodied using the metal oxide layer as a recording medium.

FIG. 1 is a diagram for explaining the structure and operations of a data storage apparatus using current switching in a metal oxide layer according to an exemplary embodiment of the present invention.

Referring to FIG. 1, the data storage apparatus may include a substrate 100, a metal oxide layer 200, a lower electrode layer 130, a probe tip 410 for an upper electrode. The metal oxide layer 200 is disposed on the substrate 100, and data is stored in local regions of the metal oxide layer 200 by controlling electrical characteristics. The lower electrode layer 130 is disposed under the metal oxide layer 200 and formed of a conductive material. The probe tip 410 is disposed opposite the lower electrode layer 130 and used to scan the metal oxide layer 200.

The metal oxide layer 200 may be formed on the substrate 100 using currently developed semiconductor fabrication technology, such as a sputtering process or an ALD process. In this case, the metal oxide layer 200 has a resistance that varies with a voltage applied thereto. Typically, the metal oxide layer may be formed of $TiO_x$, $ZrO_x$, $YO_x$, $TaO_x$, or a rare-earth metal oxide. In particular, the metal oxide layer 200 may be formed of tantalum oxide ($TaO_x$). The metal oxide layer 200 may be formed to such a thickness (e.g., about several to several tens of nm) as to allow current to flow through the metal oxide layer 200.

The lower electrode layer 130 may be formed between the metal oxide layer 200 and the substrate 100 as an electrode that applies a voltage to the metal oxide layer 200 or permits current to flow through the metal oxide layer 200. The lower electrode layer 130 may be deposited on the substrate 100 using a conductive layer, for example, a metal layer.

The probe tip 410 is provided as the upper electrode on the metal oxide layer 200 as another electrode that selectively applies a voltage to a local region of the metal oxide layer 200 or permits current to flow through the local region to the lower electrode layer 130. The probe tip 410 may be formed as a tip type such that a pointed end of the probe tip 410 is very close to the metal oxide layer 200. The probe tip 410 may include a support 450, which supports the probe tip 410, and a probe tip portion 400.

Also, the data storage apparatus of the present invention may include a substrate driver 300, which transfers the entire substrate 100 with respect to the probe tip 410 or drives the substrate 100 for a scan operation. Alternatively, the data storage apparatus may include a probe tip driver 405, which transfers the probe tip 410 on the substrate 100 or drives the probe tip 410 for the scan operation. Also, the data storage apparatus may include both the substrate driver 300 and the probe tip driver 405, which complement each other.

Furthermore, the data storage apparatus of the present invention may further include a controller 550, which controls the transfer of the probe tip 410, the transfer of the substrate 100, or the scan operation. Information or data collected by the probe tip 410 is transmitted to the controller 550.

Also, the controller 550 serves to control a write operation of storing data in local regions of the metal oxide layer 200 using the probe tip 410. For instance, when a write voltage is applied between the probe tip 410 and the lower electrode layer 130 to change the resistance of a corresponding local region of the metal oxide layer 200, the controller 550 enables selective application of the write voltage to the local region.

Once a voltage is applied between the probe tip 410 and the lower electrode layer 130, current flows from the lower electrode layer 130 through a local region of the metal oxide layer 200 to the probe tip 410 according to the resistance of the local region of the metal oxide layer 200 on which the probe tip 410 is positioned. However, the current is measured by the controller 550 in at least two current states according to the resistance of the local region of the metal oxide layer 200.

The controller 550 can collect information on position of the probe tip 410 based on information on position of the substrate driver 300 and/or the probe tip driver 405 and read data stored in the local region from the current states measured by the probe tip 410 based on the information on the position of the probe tip 410. In order to measure the position of the probe tip 410, a position detector (not shown), for example, a position sensitive photo diode (PSPD), may be installed in the data storage apparatus.

Meanwhile, a protective layer 600 may be introduced between the probe tip 410 and the metal oxide layer 200 to protect the metal oxide layer 200 and improve the electrical and thermal properties of the metal oxide layer 200. The protective layer 600 may be formed of a conductive material. For example, the protective layer 600 may include a thin metal layer or a diamond-like carbon layer, which has a higher hardness than the metal oxide layer 200.

The operation of storing data in the metal oxide layer 200 (i.e., the write operation) involves applying a write voltage to the local region of the metal oxide layer 200 between the probe tip 410 and the lower electrode layer 130.

Figure 2:
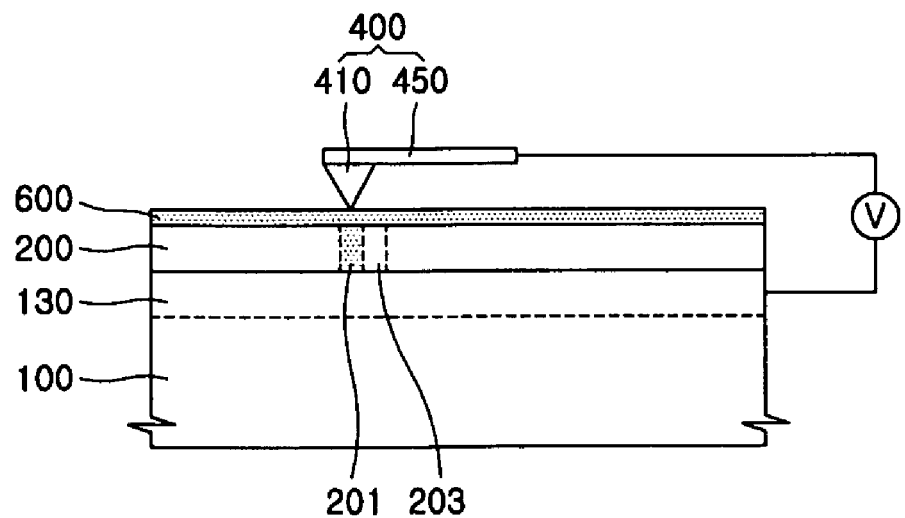
FIG. 2 is a diagram for explaining a write operation of the data storage apparatus shown in FIG. 1.
Figure 3:
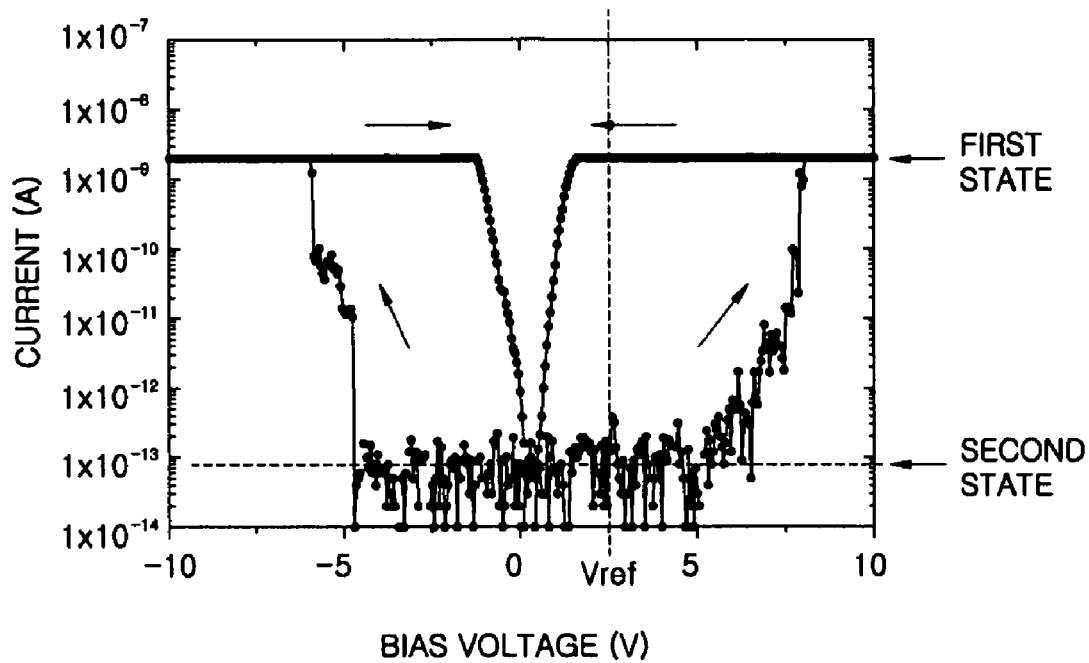
FIG. 3 is a graph of measurement results showing current with respect to voltage applied to the metal oxide layer.

FIG. 2 is a diagram for explaining a write operation of the data storage apparatus shown in FIG. 1, and FIG. 3 is a graph of measurement results showing current with respect to voltage applied to the metal oxide layer.

Referring to FIG. 2, a write operation in which data is stored in a local region of the metal oxide layer 200 can be carried out by applying a write voltage between the lower electrode 130 and the probe tip 410.

In this case, the write voltage is applied by the probe tip 410 to a local region on which the probe tip 410 is located, that is, a first local region 201. Since the write voltage is applied by a pointed end of the probe tip 410, it is selectively applied only to the first local region 201 corresponding to the pointed end thereof. The lower electrode layer 130 functions only as an electrode corresponding to the probe tip 410 for the upper electrode. Therefore, the lower electrode layer 130 may be formed under the entire surface of the metal oxide layer 200.

With the application of the write voltage, the resistance of the first local region 201 is changed. For example, when no write voltage is applied to a second local region 203 that is adjacent to the first local region 201, there is a difference in resistance between the first and second local regions 201 and 203.

The write operation is controlled by the controller 550 as described above with reference to FIG. 1. For instance, the write operation involves a scan operation using the probe tip 410 and/or a transfer operation of the substrate 100 using the probe tip driver 405 and/or the substrate driver 300 as shown in FIG. 1. Also, the position of the probe tip 410 can be detected using the drivers 405 and 300, but it may be measured by an additional position detector (e.g., a PSPD) and collected as data by the controller 550.

Accordingly, the controller 550 collects the positional information of the probe tip 410 and controls the write operation based on the information such that a write voltage is selectively applied to the first local region 201 and no write voltage is applied to the second local region 203. As a result, data is partially stored and written in the metal oxide layer 200.

Since the pointed end of the probe tip 410 has a size of several nm or less, the local region to which the write voltage is applied also has a size of only several nm. Accordingly, a data storage unit, which is determined by the local regions 201 and 203, is only several nm in size. Therefore, data storage density can be greatly increased.

When the resistance of the first local region 201 is set to first data and the resistance of the second local region 203 is set to second data, the first and second data can be read by measuring current flowing through the metal oxide layer 200 between the probe tip 410 and the lower electrode layer 200 while the probe tip 410 is scanning the metal oxide layer 200.

Because the first local region 201 is different in resistance from the second local region 203, when a read voltage is applied between the probe tip 410 and the lower electrode layer 200, different values of current are read from the first and second local regions 201 and 203.

In this case, this read operation involves a scan operation using the probe tip 410 and/or a transfer operation of the substrate 100 using the probe tip driver 405 and/or the substrate driver 300 as shown in FIG. 1. Also, the position of the probe tip 410 can be detected using the drivers 405 and 300, but it may be measured by an additional position detector (e.g., a PSPD) and collected as data by the controller 550.

Accordingly, the controller 550 collects information on values of current measured at the local regions 201 and 203. As a result, data is read from the local regions 201 and 203 of the metal oxide layer 200.

The data storage unit in which data is stored has a size of only several nm. Also, during the read operation, while a read voltage is being applied between the probe tip 410 and the lower electrode layer 130, a scan operation is performed by transferring the probe tip 410 (or transferring the substrate 100), and variations of values of current flowing through the metal oxide layer 200 are measured using the probe tip 410 according to the position of the probe tip 410. As the read operation is performed as described above, the time taken for the read operation (i.e., reproduction of memory) can be greatly reduced. The great reduction in the time taken for the read operation considerably depends on the nano-sized storage unit in which data is stored.

The above-described data storage method using the electrical characteristics of the metal oxide layer 200 is based on the principle that the resistance of the metal oxide layer 200 varies with current supplied thereto (i.e., a voltage applied thereto). When the metal oxide layer 200 is formed of $TiO_x$, $ZrO_x$, $YO_x$, $TaO_x$, or a rare-earth metal oxide, it can be observed that the resistance of the metal oxide layer 200 varies with an applied voltage. Above all, it is observed that a ($TaO_x$) layer holds a plurality of resistive states according to an applied voltage.

Referring to FIG. 3, while a bias voltage is applied to a tantalum oxide ($TaO_x$) layer, current flowing through the tantalum oxide layer is measured. In this case, the bias voltage starts from 0 V and is gradually increased, and then a voltage of inverse polarity is decreasingly applied. As a result, the measured current shows a hysteresis loop as shown in FIG. 3. From this result, it can be seen that the tantalum oxide layer has an electrical hysteresis characteristic.

In this case, the tantalum oxide layer may deviate from a stoichiometric composition but have a non-stoichiometric composition. For example, a composition ratio of tantalum to oxygen may deviate from the stoichiometric composition by several to several tens of %. The measurements shown in FIG. 3 are obtained from a tantalum oxide layer of which composition ratio deviates from the stoichiometric composition by 10%, and the tantalum oxide layer has a thickness of about 10 nm.

Referring to FIG. 3, when a voltage of about 0 to 5 V is applied to the tantalum oxide layer, a very low current value of, for example, about $1 \times 10^{-13}$ A, is measured. As the applied voltage is gradually increased to 5 V or higher, the current value is dramatically elevated, and when the applied voltage reaches about 8 V or higher, the current value becomes about $1 \times 10^{-9}$ A. In other words, the current value is increased by a hundred thousand times within the voltage range of about 5 V. This result demonstrates that the tantalum oxide layer has resistance variation. That is, the tantalum oxide layer exhibits current switching with respect to a voltage.

When the applied voltage starts to gradually decrease, the current value remains high (i.e., the resistance value remains low) and then is sharply dropped around 1 V. Accordingly, it can be understood that the resistance of the tantalum oxide layer is held constant (i.e., a memory effect arises) under a certain voltage condition.

Therefore, a voltage applied at a point in time at which the current value is sharply dropped (for example, a voltage of about 5 V or higher) can be understood as a threshold voltage. When a voltage higher than the threshold voltage is applied, it can be seen that the resistive state of the tantalum oxide layer is switched from a first state, which is a relatively high resistive state, to a second state, which is a relatively low resistive state.

As described above, the tantalum oxide layer exhibits two different resistive states, that is, the first and second states, according to an applied voltage and has the memory effect. Therefore, a memory device or a data storage apparatus can be formed using the above-described phenomenon as shown in FIG. 1.

For instance, a write voltage is set to a threshold voltage (e.g., about 8 V) that is higher than about 5 V, and a reference voltage $V_{ref}$ is set to a voltage (e.g., about 2.5 V) between 0 V and the threshold voltage, thus the tantalum oxide layer can be used as a data storage medium.

In applying a voltage of about 8 V to the selected first local region (201 of FIG. 2) of the tantalum oxide layer, a resistive state of the first local region 201 is switched to the second state as can be seen from FIG. 3. Also, as no write voltage is applied or an erase voltage is applied to the second local region (203 of FIG. 2), a resistive state of the second local region 203 is switched from the second state to the first state and remains in the first state.

When the probe tip (410 of FIG. 2) scans the local regions 201 and 203 while maintaining a read voltage of about 2.5 V, a value of current flowing between the probe tip 410 and the lower electrode layer (130 of FIG. 2) is measured. Thus, a current of about $1 \times 10^{-9}$ A is obtained at the first local region 201 that is in the second state, and a current of about $1 \times 10^{-13}$ A is obtained at the second local region 203 that is in the first state. Since there is a difference of more than a hundred thousand times between the two current values, data is distinguishable using the difference.

Meanwhile, erasing data from the first local region 201 in which the data is written can be performed by applying a voltage of inverse polarity to the write voltage. Thus, as can be seen from the hysteresis loop of FIG. 3, the resistive state of the first local region 201 can be switched from the second state to the first state.

Like in the case where the bias voltage is gradually increased from 0 V to a higher positive value, when the bias voltage is gradually decreased from 0 V to a lower negative value, almost the same hysteresis loop as shown in FIG. 3 can be obtained. That is, a resistive state is switched from the first state to the second state around −5 V.

Thus, the read voltage ranges from about 5 to about −5 V, and it can be concluded that a memory window is in the range of about 10 V. Accordingly, when determining operating conditions for the data storage apparatus, the read voltage can be determined within a considerably wide range.

In the data storage apparatus shown in FIG. 1, the metal oxide layer 200 can store data for each very fine region with a size of several nm. For this operation, the data storage apparatus may include the probe tip driver 405 and/or the substrate driver 300, which can transfer the probe tip 410 and/or the substrate 100 in units of several nm. Thus, storage of data can be controlled in units of several nm, and the electrical characteristics of the storage unit can be sequentially controlled, data can be processed in a multi-level.

As described above, the data storage apparatus may include an additional driver or additional drivers for transferring the probe tip 410 and/or the substrate 100 like a driver for an AFM apparatus.

Figure 4:
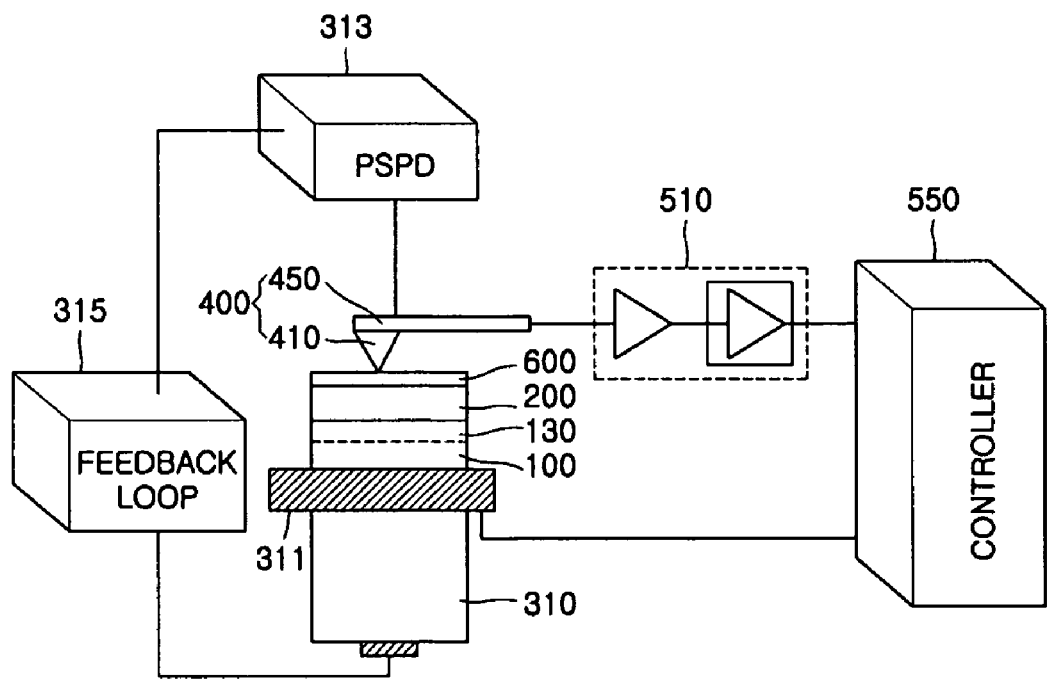
FIG. 4 is a diagram for explaining the structure and operations of a data storage apparatus using an atomic force microscope (AFM) according to an exemplary embodiment of the present invention.

FIG. 4 is a diagram for explaining the structure and operations of a data storage apparatus using an AFM according to an exemplary embodiment of the present invention.

Referring to FIG. 4, the data storage apparatus using the AFM may be structured such that it can have a nanoscale resolution using the construction of an AFM apparatus, that is, such that the position of a probe tip 410 on a metal oxide layer 200 is controlled in units of nm. Since the AFM apparatus has a nanoscale resolution, the data storage apparatus of the present invention can make use of a probe tip and/or a driver of the AFM apparatus.

For example, a substrate 100 of the present invention may be mounted on a holder 311 of the AFM apparatus. A piezo scanner 310 may be installed as the substrate driver (300 of FIG. 1) on a rear surface of the holder 311. The piezo scanner 310 serves to transfer the substrate 100 about X-, Y-, and Z-axes.

A lower electrode layer 130 is interposed between the substrate 100 and the metal oxide layer 200, and the probe tip 410 is provided on the metal oxide layer 200. In this case, a protective layer 600 may be further disposed on the metal oxide layer 410. The probe tip 410 may be an AFM probe tip for the AFM apparatus. The probe tip 410 has a pointed end, which is substantially in contact with the protective layer 600, and is supported by a probe tip support 450.

A probe tip portion 400, which includes the probe tip support 450 and the probe tip 410, transmits measured values of current to a controller 550. In this case, an amplifier 510 may be introduced between the probe tip portion 400 and the controller 550 in order to measure electrical characteristics detected by the probe tip portion 400. Also, the data storage apparatus may further include a probe tip driver for driving the probe tip 410 as shown in FIG. 1.

In the meantime, a position detector 313, such as a PSPD, may be installed to measure the position of the probe tip 410 on the metal oxide layer 200. The position detector 313 measures the position of the probe tip 410 using a laser and transmits the measured value to the piezo scanner 310 so that the piezo scanner 310 controls the position of the substrate 100. In this case, since a signal transmitted from the position detector 313 is very feeble, it is amplified and sent to a feedback loop 315 so that the piezo scanner can control the position of the substrate 100 through the feedback loop 315.

The controller 550 collects information on the position of the substrate 100 and controls the position of the probe tip 410 on the metal oxide layer 200 based on the information. The controller 550 leads the probe tip 410 to be positioned at a desired local region (i.e., a desired storage unit) of the metal oxide layer 200 by controlling the piezo scanner 310 and then applies a write voltage between the probe tip 410 and the metal oxide layer 200 so that data can be stored in the corresponding storage unit.

Also, the controller 550 controls the piezo scanner 310 such that the probe tip 410 scans the metal oxide layer 200, collects information on the position of the probe tip 410, measures values or variations of current flowing through the storage unit of the metal oxide layer 200 on which the probe tip 410 is positioned, and reads data stored in each storage unit of the metal oxide layer 200.

In making use of the construction of the AFM apparatus as described above, since the AFM apparatus basically has a spatial resolution of several nm, storage units of several nm can be defined in the metal oxide layer 200. Accordingly, data can be stored in the large-area metal oxide layer 200 in units of nm, thus storage density can be greatly elevated.

Although it is described in the present embodiment that the data storage apparatus can make use of the construction of the AFM apparatus, the present invention is not limited thereto. It would be understood that FIG. 4 illustrates an example of the data storage apparatus in which the position of the probe tip 410 on the metal oxide layer 200 is controlled in units of nm like the AFM apparatus.

According to the present invention as described above, current is supplied to a desired position so that the electrical characteristics of a local region of a metal oxide layer are controlled to store data in the local region. The metal oxide layer can be simply formed using a post-sputter oxidation process or an ALD process. Since these deposition processes are known as current semiconductor fabrication technology for mass production, a large-area metal oxide layer can be obtained in a simple process. Also, data is stored in the metal oxide layer in units of nm, thus storage density can be dramatically increased and production cost can be effectively curtailed.

The present invention provides a highly-integrated data storage apparatus, which stores and processes data in units of nm using the construction of an AFM apparatus such that the electrical characteristics of a local region of a metal oxide layer formed of a material having a relatively high resistance are controlled. By making use of an AFM, the electrical characteristics of the local region of the metal oxide layer can be controlled to nanoscale controlling and measuring precision, so that the metal oxide layer can be utilized as a data recording medium.

Also, a storage medium and current controlling and/or measuring apparatus according to the present invention are compatible with current semiconductor fabrication technology. Therefore, an ultrahigh-integrated and ultrahigh-speed data storage apparatus can be embodied using updated technology.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data storage apparatus comprising:
a substrate;
a lower electrode layer disposed on the substrate;
a metal oxide layer disposed on the lower electrode layer;
a probe tip disposed on the metal oxide layer opposite the lower electrode layer and for scanning a local region of the metal oxide layer in units of nanometer, wherein the probe tip applies a write voltage to the local region of the metal oxide layer so that the resistance of the local region is sharply changed until a resistive state of the local region is switched from a first state to a second state or measures current flowing through the local region according to the resistive state and reads data stored in the local region;
a driver for transferring the position of the probe tip to the local region of the metal oxide layer; and
a controller for controlling the probe tip and the driver,
wherein the driver includes:
a substrate driver for transferring the substrate in at least units of nanometer; and
a probe tip driver for driving the probe tip.

2. The data storage apparatus according to claim 1, wherein the metal oxide layer is formed of any one metal oxide selected from the group consisting of titanium oxide (TiO$_x$), zirconium oxide (ZrO$_x$), yttrium oxide (YO$_x$), tantalum oxide (TaO$_x$), and rare-earth metal oxides.

3. The data storage apparatus according to claim 1, further comprising a position detector for measuring the position of the probe tip on the metal oxide layer using a laser.

4. The data storage apparatus according to claim 1, wherein the substrate driver includes a piezo scanner used for an atomic force microscope (AFM), and the probe tip driver includes a probe tip driver used for the AFM, which drives the probe tip including a probe tip used for the AFM.

5. The data storage apparatus according to claim 1, further comprising a protective layer disposed on the metal oxide layer and formed using a conductive layer that is one of a metal layer and a diamond-like carbon layer.

* * * * *